(12) United States Patent
Kim et al.

(10) Patent No.: US 12,291,279 B2
(45) Date of Patent: May 6, 2025

(54) BODY FOR VEHICLE

(71) Applicants: Hyundai Motor Company, Seoul (KR); Kia Corporation, Seoul (KR)

(72) Inventors: Do Hoi Kim, Sejong-si (KR); Joo Tae Oh, Seoul (KR); Frank Petetin, Mainz (DE); Bahman Moarefi, Mainz (DE)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 420 days.

(21) Appl. No.: 17/873,600

(22) Filed: Jul. 26, 2022

(65) Prior Publication Data
US 2023/0139918 A1 May 4, 2023

(30) Foreign Application Priority Data
Nov. 2, 2021 (KR) .......................... 10-2021-0148783

(51) Int. Cl.
| | | |
|---|---|---|
| B62D 27/02 | (2006.01) | |
| B62D 25/02 | (2006.01) | |
| B62D 25/04 | (2006.01) | |
| B62D 65/04 | (2006.01) | |

(52) U.S. Cl.
CPC ......... *B62D 27/026* (2013.01); *B62D 25/025* (2013.01); *B62D 25/04* (2013.01); *B62D 27/023* (2013.01); *B62D 65/04* (2013.01)

(58) Field of Classification Search
CPC .... B62D 27/026; B62D 25/025; B62D 25/04; B62D 27/023; B62D 65/04; B62D 33/044; B62D 25/2036
See application file for complete search history.

(56) References Cited

U.S. PATENT DOCUMENTS

| | | | | |
|---|---|---|---|---|
| 691,661 | A * | 1/1902 | Priest | B62D 27/023 296/29 |
| 732,389 | A * | 6/1903 | Wheater | E04B 1/2604 403/258 |
| 5,372,400 | A * | 12/1994 | Enning | B62D 25/025 296/29 |
| 5,593,245 | A * | 1/1997 | Herz | B62D 33/044 403/231 |
| 6,010,182 | A * | 1/2000 | Townsend | B64C 1/08 296/29 |
| 6,619,715 | B2 * | 9/2003 | Rackham | B62D 27/026 296/203.02 |

(Continued)

FOREIGN PATENT DOCUMENTS

| | | |
|---|---|---|
| JP | 2014226985 A | 12/2014 |
| JP | 6700122 B2 | 5/2020 |

(Continued)

*Primary Examiner* — Jason S Morrow
(74) *Attorney, Agent, or Firm* — SLATER MATSIL, LLP

(57) ABSTRACT

An embodiment vehicle body includes a side sill coupled to a side of a vehicle floor and extending in a front-rear direction of the vehicle body, a coupling member coupled to a top of the side sill and having a coupling groove penetrating in an up-down direction, and a pillar member extending in the up-down direction such that an upper end portion is connected to a roof and a lower end portion is inserted into the coupling groove and coupled to the coupling member.

18 Claims, 17 Drawing Sheets

(56) References Cited

U.S. PATENT DOCUMENTS

| | | | | |
|---|---|---|---|---|
| 6,688,000 | B2 * | 2/2004 | Wang | B62D 25/04 |
| | | | | 29/897.3 |
| 7,001,097 | B2 * | 2/2006 | Wang | F16B 9/09 |
| | | | | 403/231 |
| 8,272,682 | B2 * | 9/2012 | Cimatti | B62D 25/025 |
| | | | | 296/204 |
| 9,308,941 | B2 | 4/2016 | Kanaguchi et al. | |
| 9,381,943 | B2 | 7/2016 | Kang et al. | |
| 9,751,569 | B2 * | 9/2017 | Ayuzawa | B62D 25/04 |
| 9,988,093 | B2 * | 6/2018 | Pastrick | B62D 23/005 |
| 10,167,019 | B2 | 1/2019 | Ayuzawa et al. | |
| 10,640,154 | B2 * | 5/2020 | Takii | B62D 65/02 |
| 11,167,807 | B2 * | 11/2021 | Kim | B62D 27/023 |
| 11,332,192 | B2 * | 5/2022 | Kim | B62D 21/02 |
| 12,060,112 | B2 * | 8/2024 | Moarefi | B62D 27/065 |
| 2010/0244497 | A1 * | 9/2010 | Honda | B62D 23/005 |
| | | | | 296/205 |
| 2011/0158741 | A1 * | 6/2011 | Knaebel | B62D 27/026 |
| | | | | 156/293 |
| 2017/0137066 | A1 | 5/2017 | Ayuzawa et al. | |
| 2022/0266913 | A1 * | 8/2022 | Aizik | B62D 23/005 |
| 2022/0402559 | A1 * | 12/2022 | Allum | B62D 27/06 |
| 2023/0068984 | A1 * | 3/2023 | Kim | B62D 27/023 |
| 2023/0331310 | A1 * | 10/2023 | Lee | B62D 25/04 |
| 2023/0382467 | A1 * | 11/2023 | Song | B62D 27/065 |
| 2023/0399060 | A1 * | 12/2023 | Shin | B62D 27/065 |
| 2024/0067273 | A1 * | 2/2024 | Maeda | B62D 25/145 |
| 2024/0199122 | A1 * | 6/2024 | Kang | B62D 25/04 |

FOREIGN PATENT DOCUMENTS

| | | |
|---|---|---|
| KR | 20040110804 A | 12/2004 |
| KR | 101620226 B1 | 5/2016 |

\* cited by examiner

BODY FOR VEHICLE

CROSS-REFERENCE TO RELATED APPLICATIONS

This application claims the benefit of Korean Patent Application No. 10-2021-0148783, filed on Nov. 2, 2021, which application is hereby incorporated herein by reference.

TECHNICAL FIELD

The present invention relates to a vehicle body.

BACKGROUND

A B-pillar is adopted in a vehicle body to reinforce the rigidity of the vehicle. In the B-pillar, members constituting the B-pillar of the vehicle undergo a large deformation at the initial stage of a side collision and absorb an impact caused by the side collision.

A conventional vehicle body was manufactured by manufacturing the vehicle undercarriage first, then coupling the pillar members, and then coupling the vehicle roof.

However, recent changes in the length of vehicles call for technology for setting the number of pillar members and coupling a plurality of pillar members to the lower part of a vehicle.

The matters described above as a technical background are intended only for a better understanding of the background of the present invention and are not to be taken as acknowledgment that they pertain to the conventional art already known to those skilled in the art.

SUMMARY

The present invention relates to a vehicle body. Particular embodiments relate to technology for coupling a side sill and a pillar member of a vehicle to each other.

Embodiments of the present invention can resolve issues in the art, and an embodiment of the present invention provides a coupling member for coupling a pillar member to a side sill of a vehicle to facilitate the coupling of the pillar member to the side sill.

A vehicle body according to embodiments of the present invention includes a side sill coupled to a side of a vehicle floor to extend in the front-rear direction, a coupling member coupled to the top of the side sill and provided with a coupling groove penetrating in the up-down direction, and a pillar member extending in the up-down direction such that an upper end portion is connected to a roof and a lower end portion is inserted into the coupling groove to be coupled to the coupling member.

The coupling member may be formed with a protrusion portion protruding from an inner surface toward the center of the coupling groove.

The pillar member may be formed with an insertion portion into which the protrusion portion is inserted in a shape corresponding to the protrusion portion at a lower end portion.

The protrusion portion may be formed such that the cross-sectional area expands in the protruding direction and may be fitted into the insertion portion concurrently when the pillar member is inserted into the coupling groove downward from above.

The coupling member may include a rib formed inside and configured to extend in a direction crossing the coupling groove that extends in the up-down direction and to connect the coupling groove to an outer surface of the coupling member.

The coupling member may be formed with a first injection hole that penetrates the coupling groove from the outside and through which an adhesive material is injected.

The coupling member may be formed with a second injection hole that penetrates in the up-down direction and through which the adhesive material is injected to a lower surface of the coupling member.

The second injection hole may include an opening portion in which a part of an outer surface is open.

The coupling member and the pillar member may be coupled to each other by bolting inward from the outside in a direction crossing the length direction of the pillar member.

An upper surface of the coupling member may be formed to incline upward from the inside to the outside of the vehicle.

The coupling member may include a cover formed to cover the upper surface.

A connecting member which extends in the up-down direction to be inserted into the coupling groove and which connects the pillar member to the coupling member by the insertion of the lower end portion of the pillar member into a through groove provided to penetrate in the up-down direction may be further included.

The coupling member may be formed with the first injection hole that penetrates the coupling groove from the outside and through which an adhesive material is injected, and the connecting member may be provided with a first guide groove inclined downward and indented from the outer surface of the coupling member at a position where the adhesive material is introduced from the first injection hole to guide the flow of the adhesive material.

The connecting member may include a first flow hole that penetrates a through groove at a lower portion of the first guide groove so that the adhesive material flowing from the first guide groove is injected into the through groove, and a second guide groove connected to the first flow hole and indented outward from the inner surface of the through groove to guide the flow of the adhesive material flowing from the first flow hole.

The coupling member may be formed with a first injection hole that penetrates in the up-down direction and through which the adhesive material is injected to a lower surface of the coupling member, and the connecting member may include a second flow hole formed to penetrate the through groove at a position corresponding to the first injection hole and a third guide groove connected to the second flow hole and indented outward from the inner surface of a third insertion groove to guide the flow of the adhesive material flowing from the second flow hole.

In the vehicle body according to embodiments of the present invention, the coupling member is coupled to the side sill and the pillar member is inserted into and coupled to the coupling groove penetrating in the up-down direction in the coupling member so that the pillar member and the side sill are easily coupled to each other by the coupling member, thereby having the effect of cost reduction.

Further, when a plurality of pillar members are disposed, coupling the coupling members to the side sill and the pillar members to the coupling members allows adoption of the pillar members in various types of vehicles according to the vehicle models according to vehicle models and front-rear lengths, thereby having the effect of excellent general-purpose applicability.

Further, a connecting member is provided between the pillar member and the coupling member and the connecting member is provided with a guide groove guiding the flow of the adhesive material injected from the coupling member, thereby having the effect of facilitating the application of the adhesive material.

DETAILED DESCRIPTION OF ILLUSTRATIVE EMBODIMENTS

Figure 1:
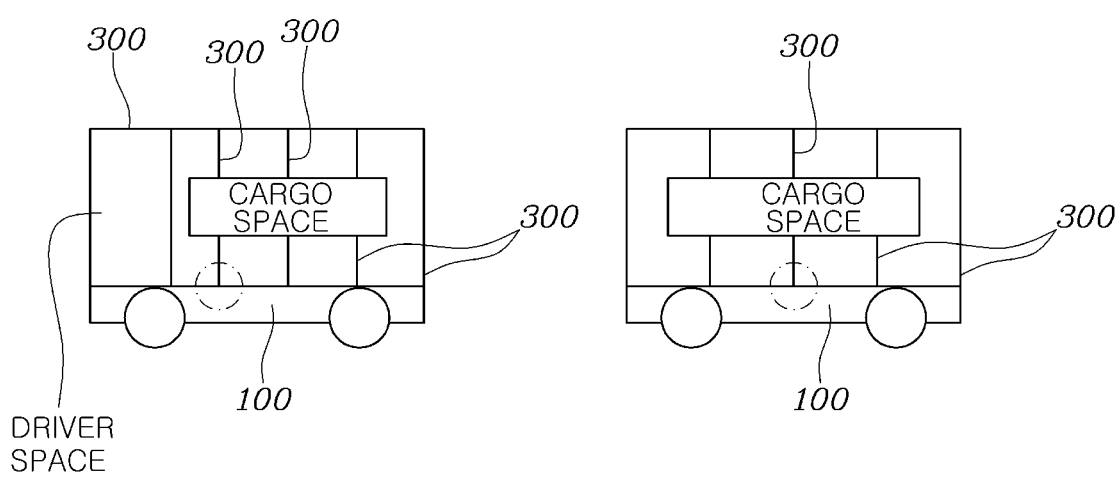
FIGS. 1 to 3 are views showing various embodiments of a vehicle body to which embodiments of the present invention are applied.

Specific structural or functional descriptions of the embodiments of the present invention disclosed in the present specification or application are illustrated by way of examples only for the purpose of describing the embodiments according to the present invention, and the embodiments according to the present invention may be implemented in various forms and are not to be construed as being limited to the embodiments described in the present specification or application.

Since the embodiments of the present invention may be modified in various ways and have various forms, specific embodiments will be illustrated in the drawings and described in the present specification or application. However, this is not intended to limit the embodiments according to the concept of the present invention to the specific forms and is to be construed as including all modifications, equivalents, and substitutes included in the spirit and technical scope of the present invention.

Terms such as first and/or second may be used to describe various components, but the components are not to be limited by the terms. The terms only serve the purpose of distinguishing one component from other components. For example, the first component may be referred to as the second component, and similarly, the second component may also be referred to as the first component without deviating from the scope of the right according to the concept of the present invention.

When a component is referred to as being "connected" or "coupled" to another component, it may be directly connected or coupled to the another component, but it is to be understood that other components may exist in between. On the other hand, when a component is referred to as being "directly connected" or "directly coupled" to another component, it is to be understood that there are no intervening components present. Other expressions describing the relationship between components such as "between" and "just between" or "adjacent to" and "directly adjacent to" are to be interpreted in the same manner.

The terms used herein are used for the purpose of describing particular embodiments only and are not intended to limit the invention. Singular expressions include plural expressions unless the context explicitly indicates otherwise. In the present specification, terms such as "comprise" or "have" are intended to designate the presence of implemented features, numbers, steps, operations, components, parts, or combinations thereof and are not to be understood to preclude the presence or additional possibilities of one or more of other features, numbers, steps, operations, components, parts or combinations thereof in advance.

Unless otherwise defined, all terms used herein, including technical or scientific terms, have the same meanings as are generally understood by those with common knowledge in the art to which the present invention pertains. It will be further understood that terms, such as those defined in commonly used dictionaries, are to be interpreted as having a meaning that is consistent with their meaning in the context of the present specification, and will not be interpreted in an idealized or overly formal sense unless expressly so defined herein.

In the following, preferred embodiments of the present invention will be described in detail with reference to the accompanying drawings. The same reference numerals presented in each drawing denote the same members.

Figure 2:
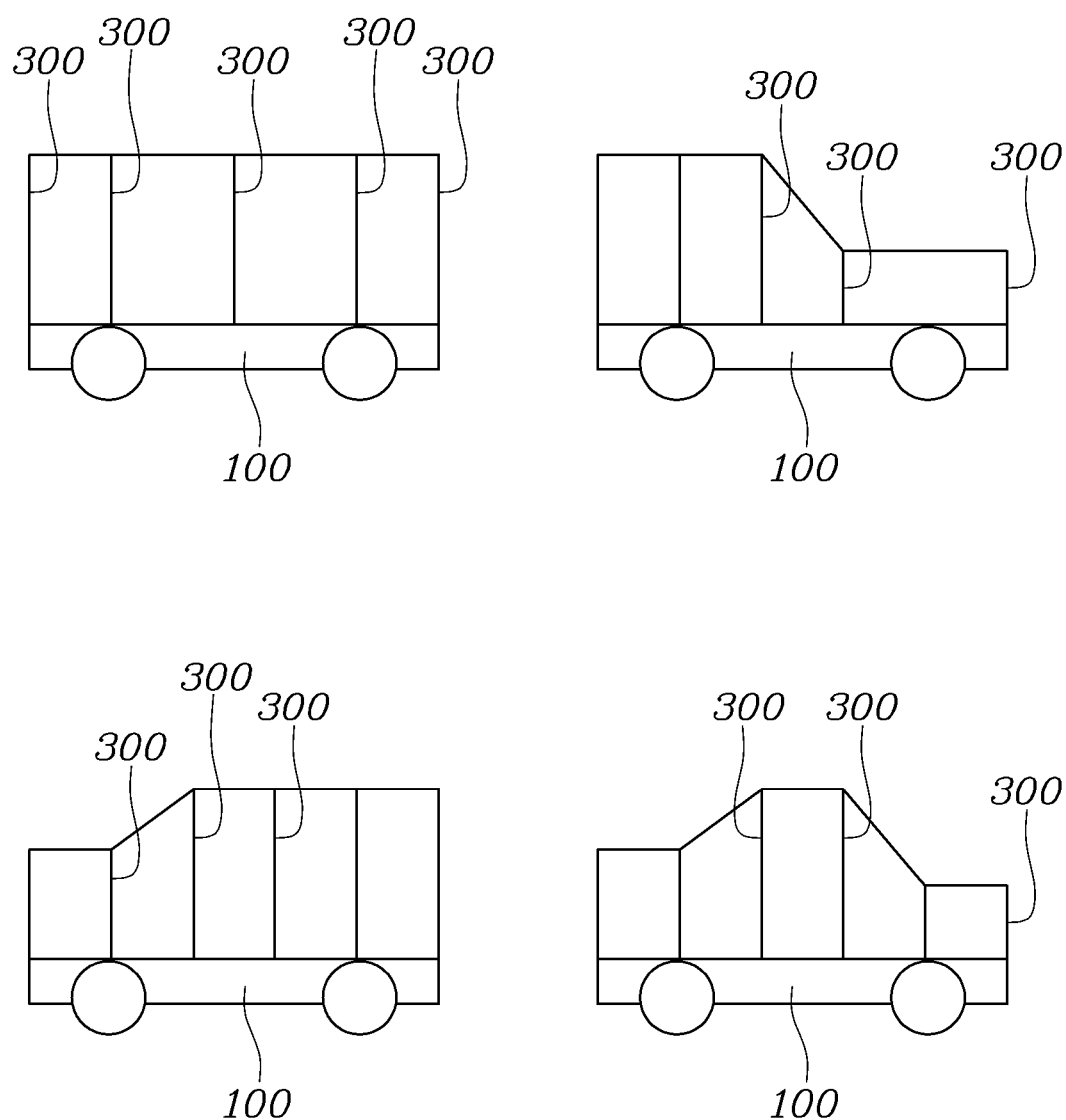
Figure 3:
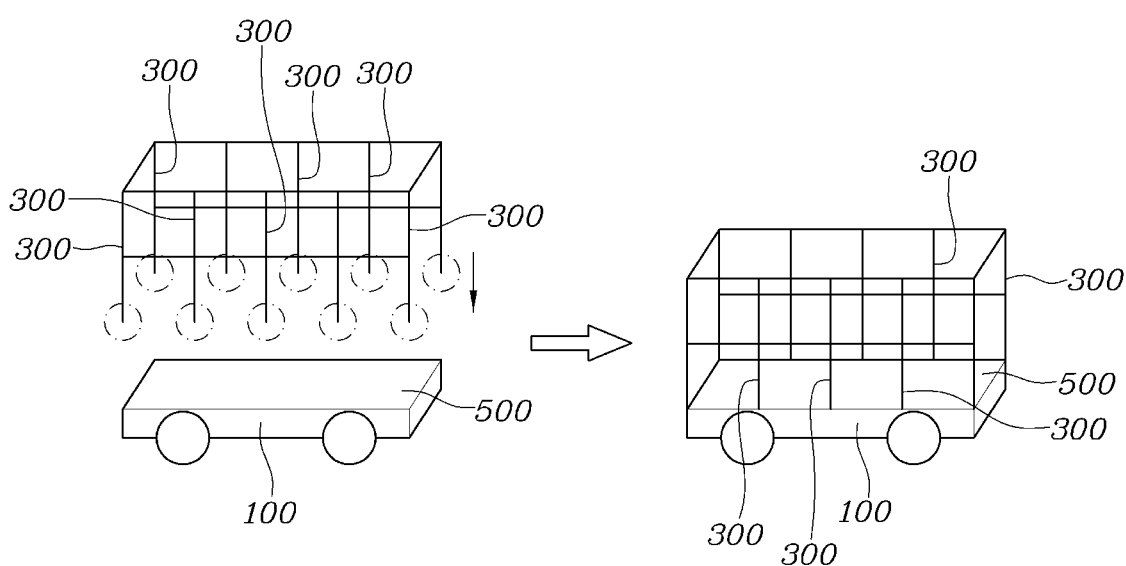

FIGS. 1 to 3 are views showing various embodiments of a vehicle body to which embodiments of the present invention are applied.

A conventional vehicle has been manufactured such that a vehicle body is molded into a monocoque body made in an integrated frame, a suspension and a wheel are mounted on a lower portion, and a driving device is mounted in the front or rear. A vehicle made of a monocoque body may be designed to apply to an internal combustion engine vehicle in general, and such a vehicle body manufacturing method needs molds in different shapes for respective vehicle types, thereby increasing manufacturing cost, incurring additional costs in the development of new vehicle types, and complicating the manufacturing process during manufacturing.

However, the development of an electric vehicle has led to the development of an integrated driving system in which a battery, a suspension, a wheel, a motor, and the like are all included by a skateboard-type platform method. In such a skateboard-type platform vehicle, a vehicle may be coupled to the top of the skateboard platform and, accordingly, vehicle bodies may be formed in different shapes even on the same skateboard platform.

As shown in FIG. 1, a vehicle body may be manufactured such that a space in which a driver drives and a cargo space in which cargo is loaded are separated, depending on the use of the vehicle. Or, a vehicle body may be manufactured into a loading space for cargo loading without a driver space in a fully autonomous driving vehicle.

Further, as shown in FIG. 2, a vehicle body may be manufactured in various shapes for the appearance of the vehicle.

For this purpose, as shown in FIG. 3, the vehicle to which embodiments of the present invention are applied is designed such that a lower body 500 and a side sill 100 of the vehicle are coupled to the top of the skateboard platform and pillar members 300 are coupled thereto.

Embodiments of the present invention are designed to facilitate the coupling of the pillar member 300 to the side sill 100, and this allows the reduction of manufacturing cost by applying the pillar members to various vehicle types without limit to the positions and number of pillar members and the simplification of the manufacturing process by eliminating the need for a separate mold for every vehicle type.

Figure 4:
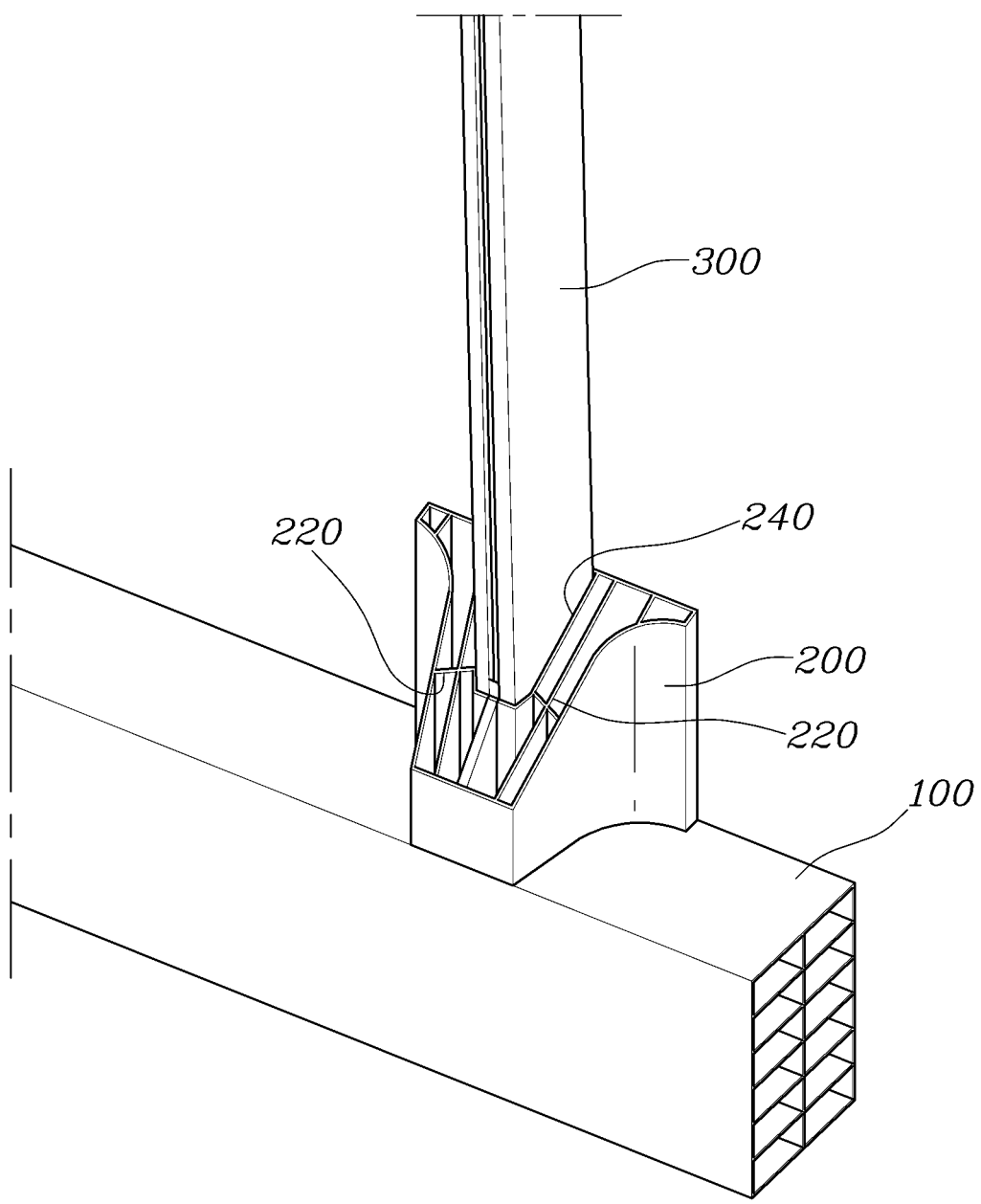
FIG. 4 is a perspective view showing a side sill, a coupling member, and a pillar member coupled to each other according to an embodiment of the present invention.
Figure 5:
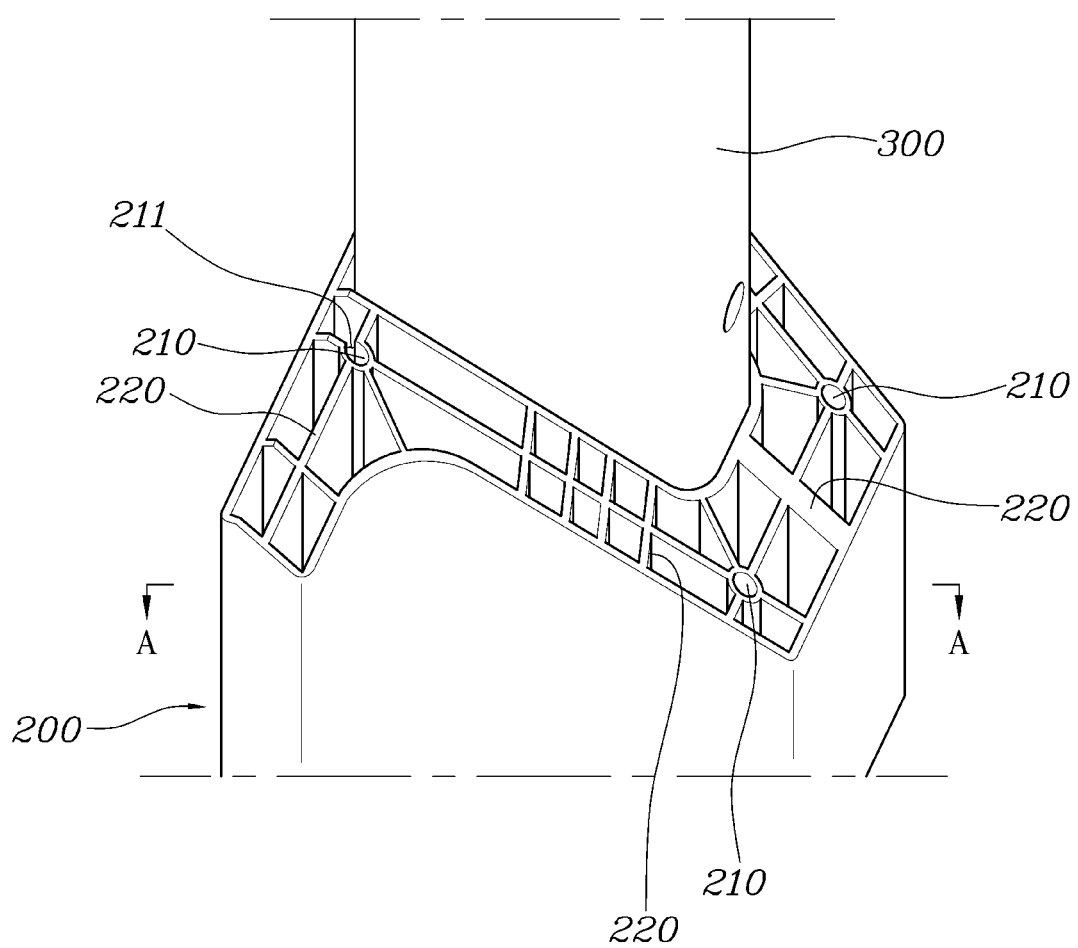
FIG. 5 is an enlarged perspective view showing a coupling member of a vehicle body according to an embodiment of the present invention.
Figure 6:
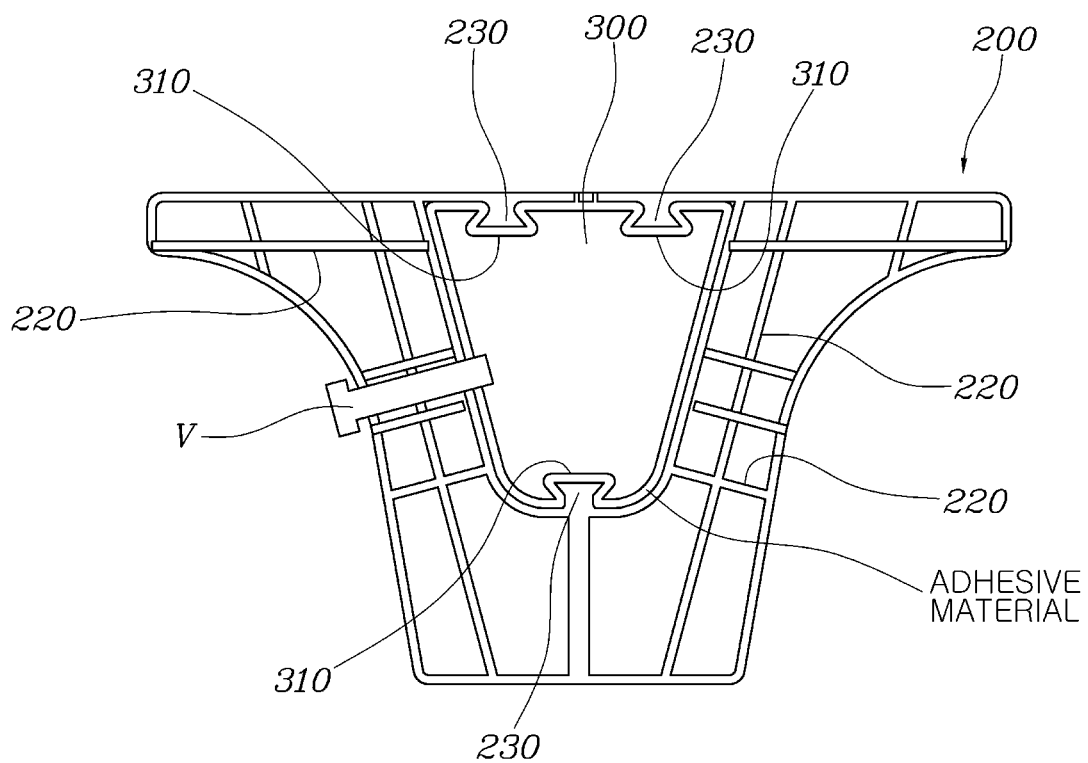
FIG. 6 is a cross-sectional view of a coupling member taken along the line A-A in FIG. 5.
Figure 7:
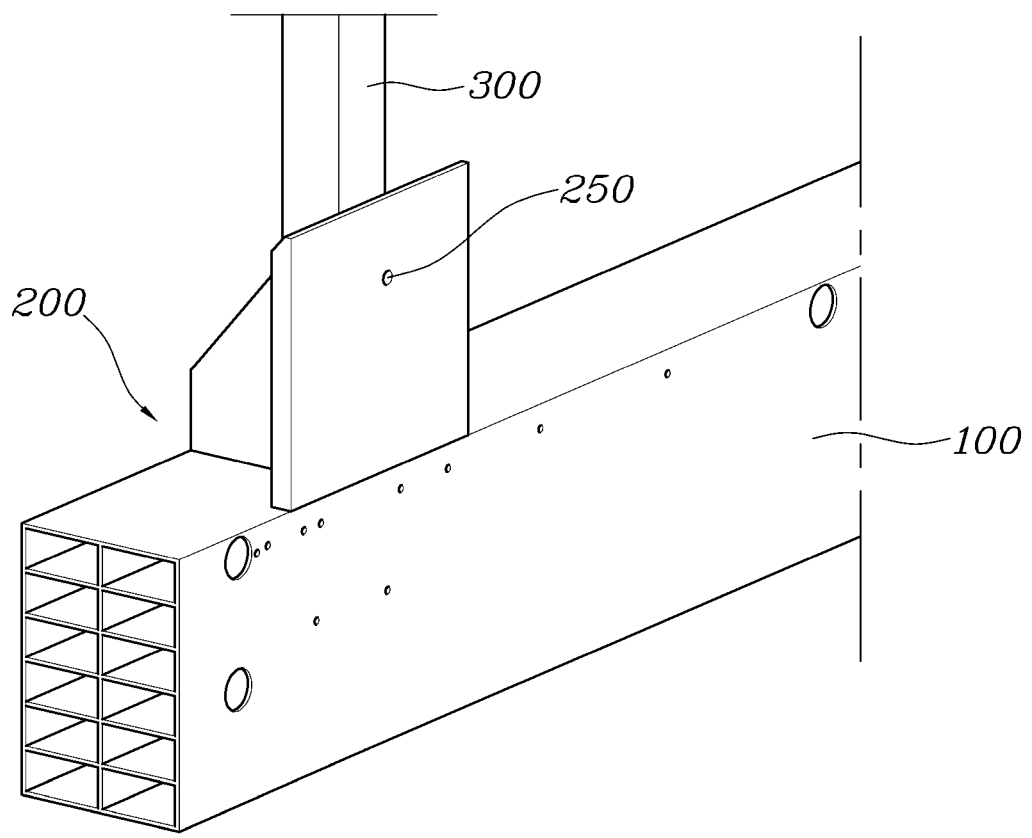
FIG. 7 is a perspective view showing a side sill, a coupling member, and a pillar member coupled to each other viewed from the outside of a vehicle in FIG. 1.
Figure 8:
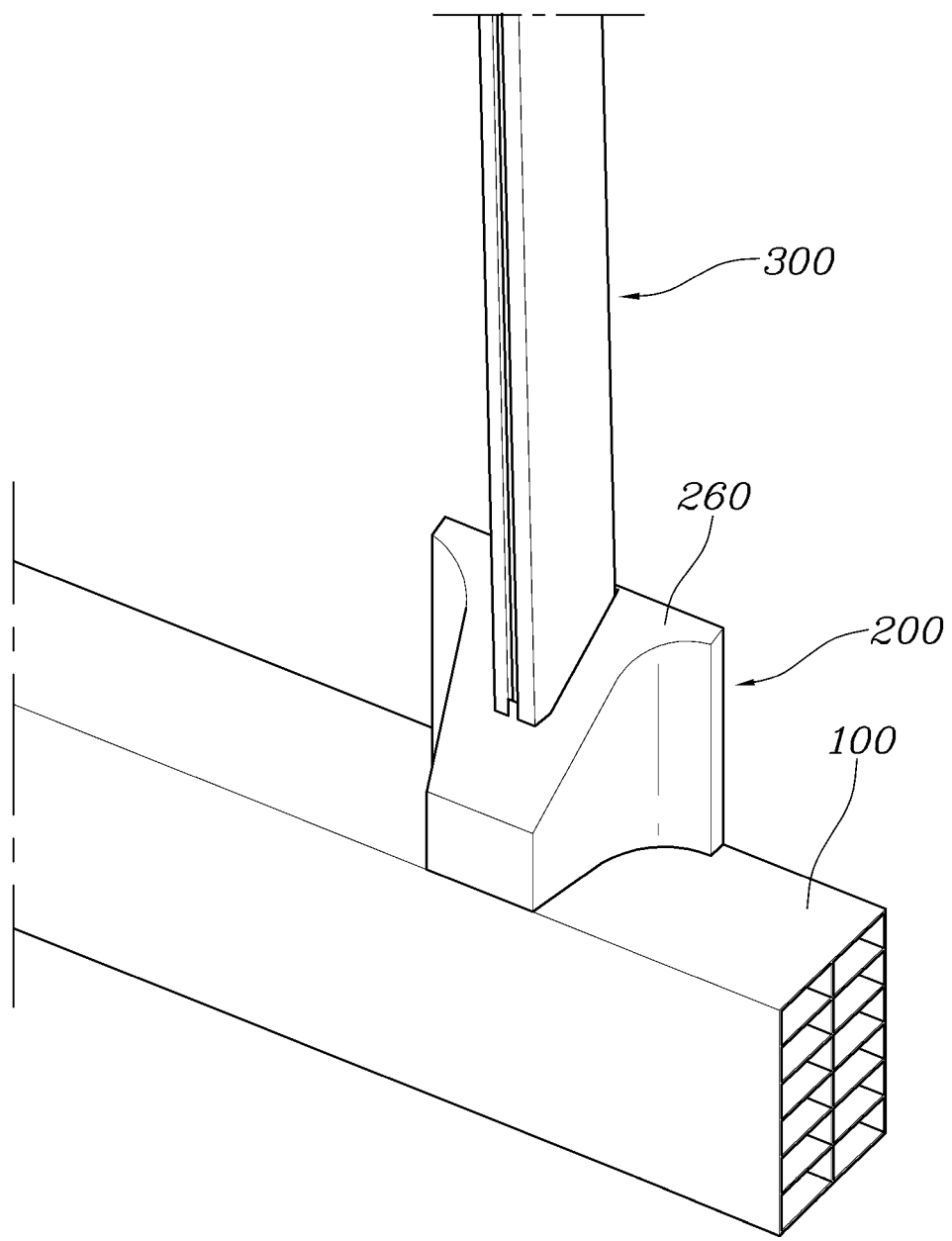
FIG. 8 is a perspective view showing a cover coupled to a coupling member of a vehicle body according to an embodiment of the present invention.

FIG. 4 is a perspective view showing the side sill 100, a coupling member 200, and the pillar member 300 of the vehicle coupled to each other according to an embodiment of the present invention; FIG. 5 is an enlarged perspective view showing the coupling member 200 of a vehicle according to an embodiment of the present invention; FIG. 6 is a cross-sectional view of a coupling member taken along the line A-A in FIG. 5; FIG. 7 is a view showing a side sill, a coupling member, and a pillar member coupled to each other viewed from the outside of a vehicle in FIG. 1; and FIG. 8 is a perspective view showing a cover 260 coupled to a coupling member 200 of a vehicle body according to an embodiment of the present invention.

A preferable embodiment of the present invention will be described with reference to FIGS. 4 to 8.

The side sills 100 are coupled to a floor on either side of a conventional vehicle to protect the vehicle against a side collision, and a pillar member 300 to be connected to a vehicle roof may be connected to the top of the side sill 100.

The side sill 100 and the pillar member 300 were integrally formed in the structure of the conventional vehicle, and such a configuration had the problem of increasing the manufacturing cost of a vehicle.

Embodiments of the present invention can resolve such a problem of a vehicle body.

A vehicle body according to embodiments of the present invention includes a side sill 100 coupled to a side of a vehicle floor and configured to extend in the front-rear direction, a coupling member 200 coupled to the top of the side sill 100 and provided with a coupling groove 240 penetrating in the up-down direction, and a pillar member 300 extending in the up-down direction such that an upper end portion is connected to the roof and a lower end portion is inserted into the coupling groove 240 to be coupled to the coupling member 200.

A pair of side sills 100 extending in the front-rear direction to be coupled to either side of the vehicle floor may be provided and the coupling member 200 may be coupled to the top of the respective side sill 100.

A coupling groove 240 penetrating in the up-down direction may be formed over the coupling member 200, and the pillar member 300 connected to the roof side of the vehicle may be connected to the penetrating coupling groove 240.

A plurality of coupling members 200 and pillar members 300 may be provided to be spaced apart from each other in the front-rear direction of the vehicle to the pair of side sills 100, and the number of coupling members 200 and pillar members 300 may be determined according to the length or type of vehicle.

An upper end of the pillar member 300 is connected to the roof member or roof side so that the pillar members 300 coupled to the side sills 100 on either side may be connected to each other to form a vehicle body.

The coupling member 200 and the side sill 100 may be coupled to each other by an adhesive material or welding coupling, and the pillar member 300 coupled to the coupling member 200 by insertion of the coupling member 200 into the coupling groove 240 may be fixed by the methods including a bolting coupling, an adhesive material, or the like.

This facilitates the coupling between the pillar member 300 and the side sill 100, each of which is formed of members, by the coupling member 200, thereby having the effect of cost reduction.

Further, when a plurality of pillar members 300 are disposed, coupling the coupling members 200 to the side sill 100 and the pillar members 300 to the coupling members 200 allows the adoption of the pillar members in various types of vehicles according to the vehicle models and front-rear lengths, thereby having the effect of excellent general-purpose applicability.

The coupling member 200 may be formed with a protrusion portion 230 protruding from an inner surface toward the center of the coupling groove 240, and the pillar member 300 may be formed with an insertion portion 310 into which the protrusion portion 230 is inserted in a shape corresponding to the protrusion portion 230 at a lower end portion.

As shown in FIG. 6, the protrusion portion 230 may protrude from an inner perimetric surface toward the center of the coupling groove 240 and extend as much as the coupling groove 240 extends in the up-down direction, and the pillar member 300 may be formed with an insertion portion 310 indented to correspond to the coupling groove 240 and configured to extend in the length direction at a lower end portion.

This has the effect of guiding the insertion of the pillar member 300 into the coupling groove 240 while the pillar member 300 moves downward as the protrusion portion 230 is inserted into the insertion portion 310 when the pillar member 300 is inserted into the coupling groove 240, and has the effect of improving the bearing capacity with which the coupling member 200 supports the pillar member 300 in the direction in which the protrusion portion 230 crosses the length direction of the pillar member 300 as the protrusion portion 230 is inserted into the insertion portion 310.

The protrusion portion 230 is formed such that the cross-sectional area expands in the protruding directions and may be fitted into the insertion portion 310 concurrently when the pillar member 300 is inserted downward into the coupling groove 240 from above.

As shown in FIG. 6, the protrusion portion 230 may be formed to expand in the direction in which the cross-section thereof extends.

This has the effect of supporting the pillar member 300 in the direction crossing the extending direction of the protrusion portion 230, which has the effect of supporting rotational stress of the pillar member 300 and the effect of improving coupling force between the coupling member 200 and the pillar member 300.

Further, the cross-sectional area of the protrusion portion 230 may expand such that the two sides are symmetrical.

Accordingly, the protrusion portion 230 expands in both directions crossing the protruding direction, thereby having the effect of supporting the torsional torque of the pillar member 300 in both directions.

Further, a plurality of protrusion portions 230 and insertion portions 310 are formed to be spaced apart from each other on the inner perimetric surface of the coupling groove 240, thereby having the effect of improving the coupling force between the pillar member 300 and the coupling member 200.

The coupling member 200 may include a rib 220 formed inside and configured to extend in a direction crossing the coupling groove 240 that extends in the up-down direction and to connect the coupling groove 240 to the outer surface of the coupling member.

As shown in FIG. 6, the coupling member 200 may be formed with an inner space inside to reduce the weight of the coupling member 200 and may be formed with the rib 220 positioned in the inner space to connect an outer surface of the coupling member 200 to an outer perimetric surface of the coupling groove 240 positioned inside the coupling member 200.

This has the effect of reducing the weight of the coupling member 200 and improving the rigidity of the coupling member 200 at the same time.

The coupling member 200 may be formed with a first injection hole 250 that penetrates the coupling groove 240 from the outside and through which an adhesive material is injected.

As shown in FIG. 7, the coupling member 200 may be formed with the first injection hole 250 penetrating the coupling groove 240 from the outer surface.

The adhesive material may be injected into the coupling groove 240 through the injection hole, and the adhesive material may be an adhesive material such as epoxy that is capable of coupling metals.

Accordingly, by guiding the flow of the adhesive material inside the injection hole in a state where the pillar member 300 is inserted into the coupling groove 240 of the coupling member 200, embodiments of the present invention may have the effect of applying the adhesive material to the inside of the coupling groove 240 for coupling the coupling member 200 with the pillar member 300, without separately applying the adhesive material to the side surface of the pillar member 300 and the inner surface of the coupling groove 240 of the coupling member 200.

The coupling member 200 may be formed with a second injection hole 210 that penetrates in the up-down direction and through which the adhesive material is injected to the bottom of the coupling member 200.

When the coupling member 200 is coupled to the side sill 100, the outside of the bottom is first coupled by welding coupling, and then, the adhesive material may be moved and applied to the bottom of the coupling member 200 through the second injection hole 210.

This allows the firm fixing of the coupling member 200 to the side sill 100 and has the effect of facilitating the application of the adhesive material to the bottom of the coupling member 200.

Further, as shown in FIG. 5, a plurality of second injection holes 210 may be formed and may be connected to the rib 220 to be fixed.

The second injection hole 210 may include an opening portion 211 in which a part of the outer surface is open.

As shown in FIG. 5, a part of the outer surface of the second injection hole 210 may be open to form the opening portion 211, and the adhesive material may flow downward along the part in which the inner circumferential surface of the second injection hole 210 is formed.

That is, when the adhesive material is injected through the second injection hole 210, the inside air escapes through the opening portion 211, thereby having the effect of the adhesive material easily flowing to the bottom of the coupling member 200.

The coupling member 200 and the pillar member 300 may be coupled to each other by bolting a bolt V inward from the outside in a direction crossing the length direction of the pillar member 300.

As shown in FIG. 6, the pillar member 300 may be inserted into the coupling groove 240 of the coupling member 200 to be coupled to the coupling member 200, and then, may be fixed by bolting coupling by inserting the bolt V in the direction crossing the length direction of the pillar member 300 from the outside of the coupling member 200.

The adhesive material is injected through the first injection hole 250 to fix the pillar member 300 to the coupling member 200 after the pillar member 300 is fixed to the coupling member 200 by bolting coupling, thereby having the effect of double fixing the pillar member 300 to the coupling member 200.

The upper surface of the coupling member 200 may be formed to incline upward from the inside to the outside of the vehicle.

As shown in FIGS. 4 and 5, the upper surface of the coupling member 200 may be formed to incline upward from the inside to the outside of the vehicle so that the outer surface of the coupling member 200 may be higher.

The outer surface of the coupling member 200 is formed to be higher so that rigidity may be improved to better protect the pillar member 300 and the side sill 100 in the event of a collision, and further, the inclination may be set at various angles in consideration of the rigidity and the like.

As shown in FIG. 8, the coupling member 200 may include a cover 260 formed to cover the upper surface.

The coupling member 200 may be formed by injection molding in a shape with an open-top so as to form the rib 220 and the coupling groove 240 inside.

Accordingly, there is a concern that an external foreign material may be introduced into the inner space and there is the problem that the introduction of an external foreign material renders the adhesion by an adhesive material difficult.

In order to resolve the issue, the cover 260 covering the upper surface of the coupling member 200 may be provided to prevent foreign material from being introduced inside.

Figure 9:
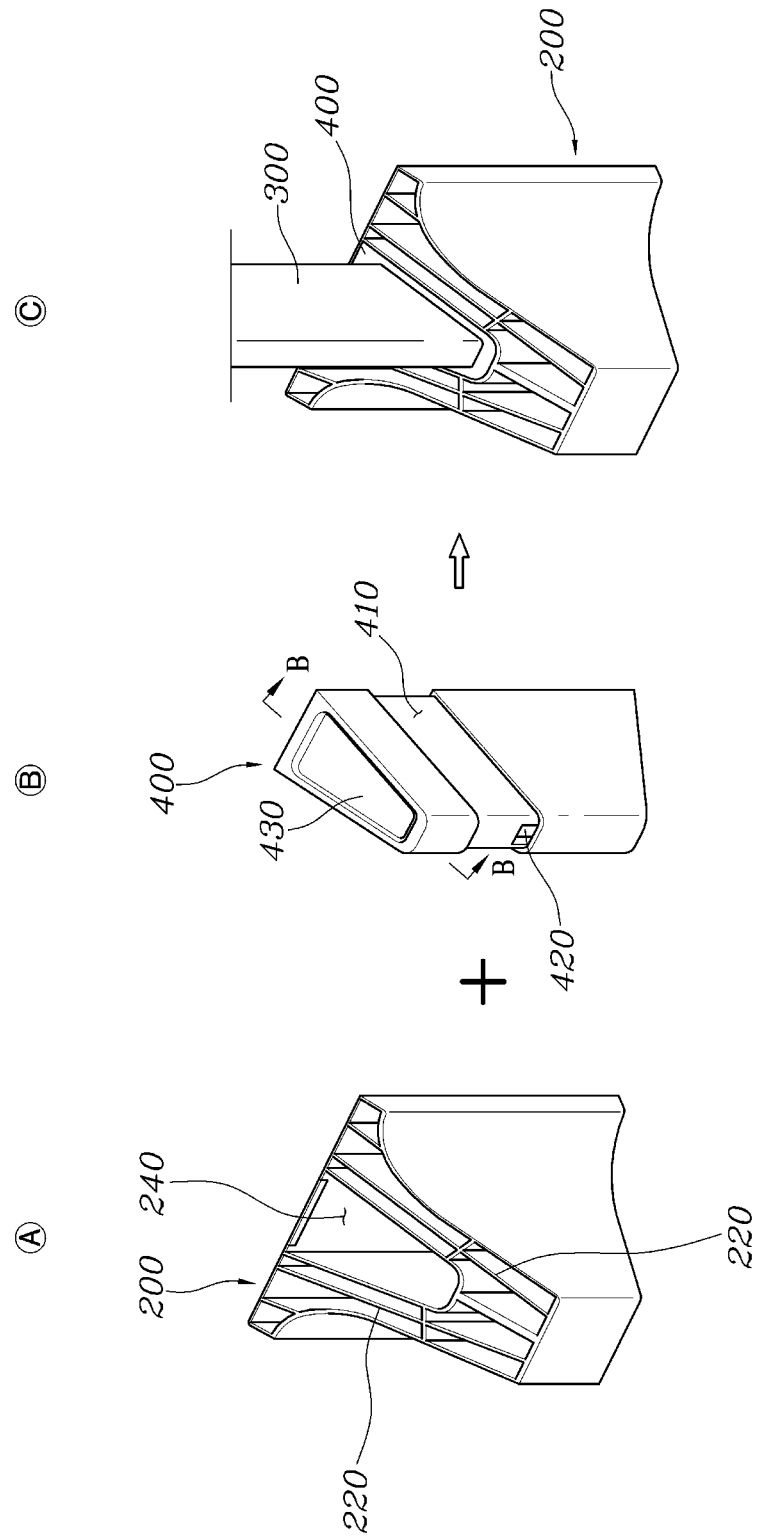
FIG. 9 is a perspective view showing a coupling member, a connecting member, and a pillar member of a vehicle coupled to each other according to another embodiment of the present invention.
Figure 10:
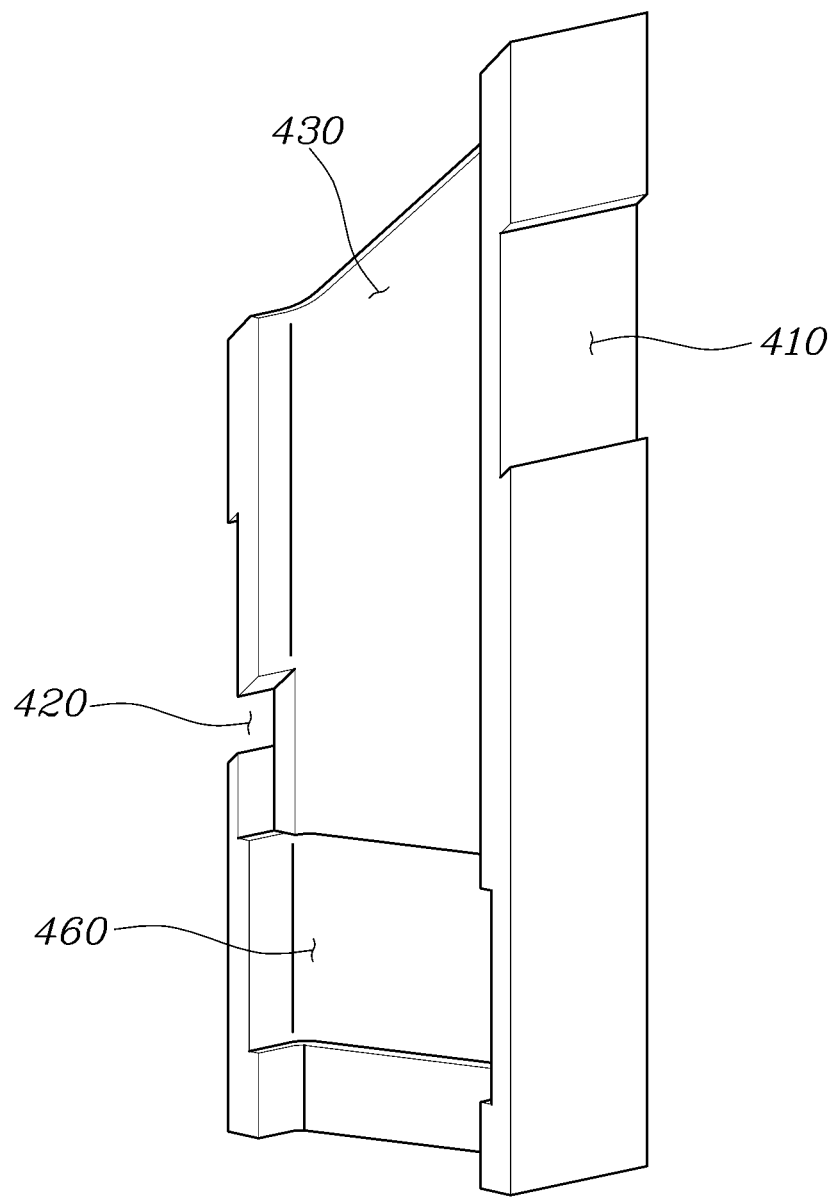
FIG. 10 is a longitudinal view of a connecting member taken along the line B-B in FIG. 9.
Figure 11:
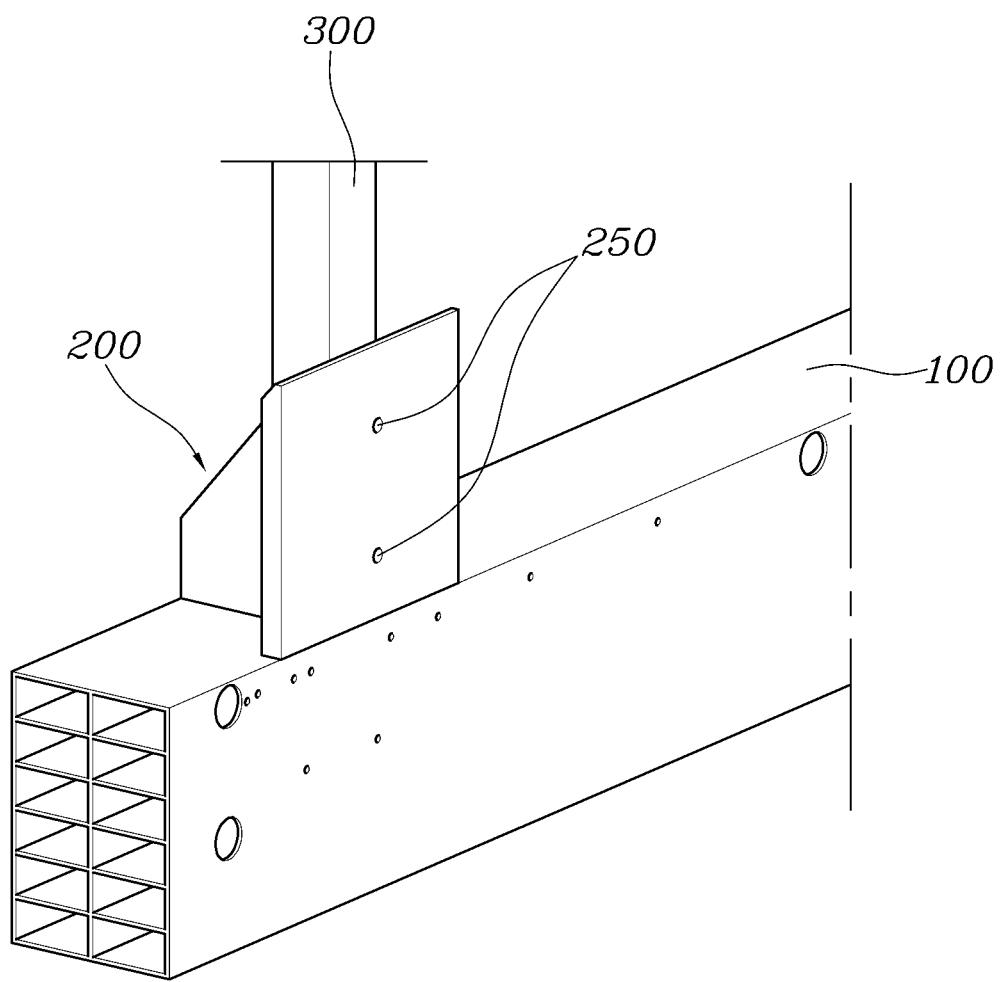
FIG. 11 is a perspective view showing a coupling member, a connecting member, and a pillar member of a vehicle body coupled to each other viewed from the outside of the vehicle according to still another embodiment of the present invention.
Figure 12:
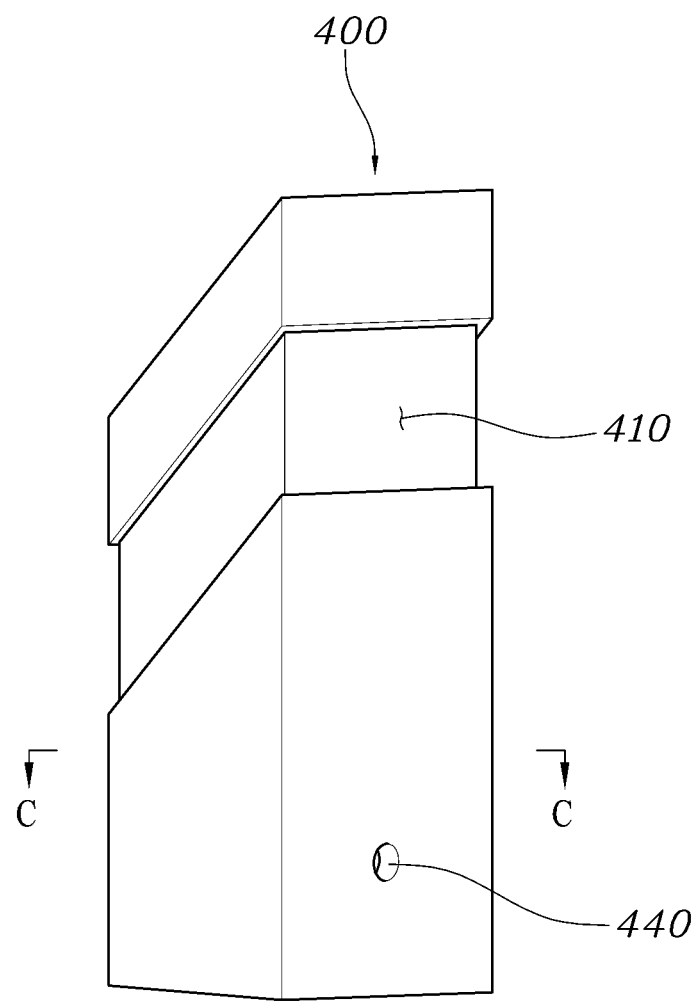
FIG. 12 is a view showing a connecting member according to still another embodiment of the present invention.
Figure 13:
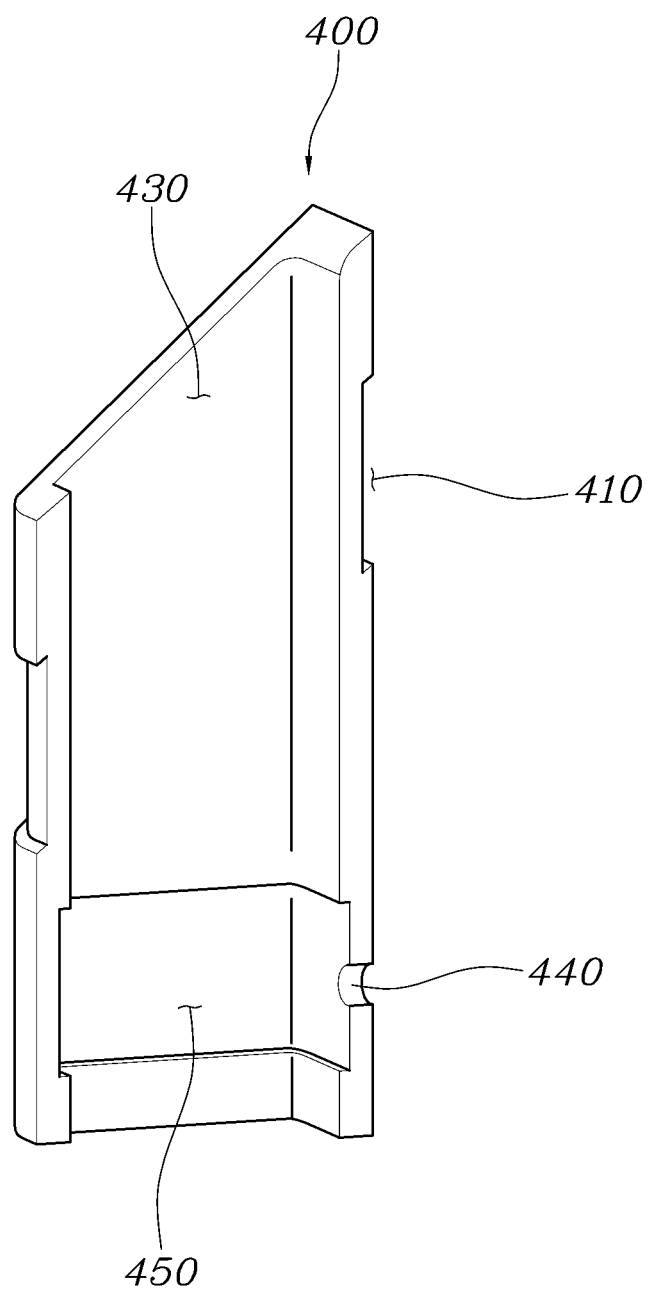
FIG. 13 is a cross-sectional view of a connecting member taken along the line C-C in FIG. 12.

FIG. 9 is a perspective view showing the coupling member 200, a connecting member 400, and the pillar member 300 of a vehicle body coupled to each other according to still another embodiment of the present invention; FIG. 10 is a longitudinal view of a connecting member taken along the line B-B in FIG. 9; FIG. 11 is a perspective view showing the coupling member 200, the connecting member 400, and the pillar member 300 of a vehicle body coupled to each other viewed from the outside of the vehicle according to still another embodiment of the present invention; FIG. 12 is a view showing the connecting member 400 according to still another embodiment of the present invention; and FIG. 13 is a longitudinal view showing the connecting member taken along the line C-C in FIG. 12.

Still another embodiment of a vehicle body according to embodiments of the present invention will be described with reference to FIGS. 9 to 13.

The connecting member 400 which extends in the up-down direction to be inserted into the coupling groove 240 and which connects the pillar member 300 to the coupling member 200 by the insertion of the lower end portion of the pillar member 300 into a through groove 430 provided to penetrate in the up-down direction may be further included.

As shown in FIG. 9, the connecting member 400 extending in the up-down direction of the vehicle may be inserted into the coupling groove 240 of the coupling member 200 and the pillar member 300 may be inserted into the through groove 430 penetrating in the up-down direction of the connecting member 400 so that the pillar member 300, the connecting member 400, and the coupling member 200 may be coupled to each other.

This has the effect of minimizing the height difference between the coupling member 200 and the pillar member 300 and has the effect of improving rigidity with which the lower portion of the pillar member 300 is supported in the lateral and vertical directions of the vehicle.

Further, the connecting member 400 may be coupled to the pillar member 300 with an adhesive material or by welding coupling.

The coupling member 200 may be formed with the first injection hole 250 that penetrates the coupling groove 240 from the outside and through which the adhesive material is injected, and the connecting member 400 may be provided with a first guide groove 410 inclined downward and indented from the outer surface of the coupling member 200 at a position where the adhesive material is introduced from the first injection hole 250 to guide the flow of the adhesive material.

As shown in FIG. 9, the adhesive material is injected through the first injection hole 250 that penetrates the coupling groove 240 from the outside of the coupling member 200 to inject the adhesive material into the coupling groove 240, the connecting member 400 is provided with the first guide groove 410 formed to be indented from the outer perimetric surface and inclined downward to guide the flow of the injected adhesive material, and the first guide groove 410 is formed around the outer perimetric surface of the connecting member 400, thereby having the effect of guiding the flowing direction of the adhesive material so that the adhesive material spreads over the entire outer perimetric surface.

The connecting member 400 may include a first flow hole 420 that penetrates the through groove 430 at a lower end portion of the first guide groove 410 and through which the adhesive material flowing from the first guide groove 410 is injected into the through groove 430, and a second guide groove 460 connected to the first flow hole 420 and indented outward from the inner surface of the through groove 430 to guide the flow of the adhesive material flowing in the first flow hole 420.

As shown in FIG. 10, in order to introduce the adhesive material of which the flow is guided by the first guide groove 410 into the through groove 430, the first flow hole 420 penetrating the lower end portion of the first guide groove 410 is formed so that the adhesive material may flow into the through groove 430 through the first flow hole 420.

This allows the coupling of the connecting member 400 to the pillar member 300 by an adhesive material.

Further, the second guide groove 460 that guides the flow of the adhesive material introduced into the through groove 430 through the first flow hole 420 so that the adhesive material flows inside the through groove 430 is formed to be indented outward from the inside of the through groove 430 such that the adhesive material flows along the second guide groove 460, thereby having the effect of coupling the pillar member 300 to the connecting member 400.

The connecting member 400 may include a second flow hole 440 formed to penetrate the through groove 430 at a position corresponding to the first injection hole 250, and a third guide groove 450 connected to the second flow hole 440 and indented outward from the inner surface of the third insertion groove to guide the flow of the adhesive material flowing into the second flow hole 440.

As shown in FIGS. 11 to 13, the second flow hole 440 through which the adhesive material injected into the first injection hole 250 is injected into the through groove 430 may be formed at the position corresponding to the first injection hole 250, and the adhesive material flows along the third guide groove 450 connected to the second flow hole 440 and is formed to be indented outward from the inside of the through groove 430, thereby having the effect of coupling the pillar member 300 to the connecting member 400.

Figure 14A:
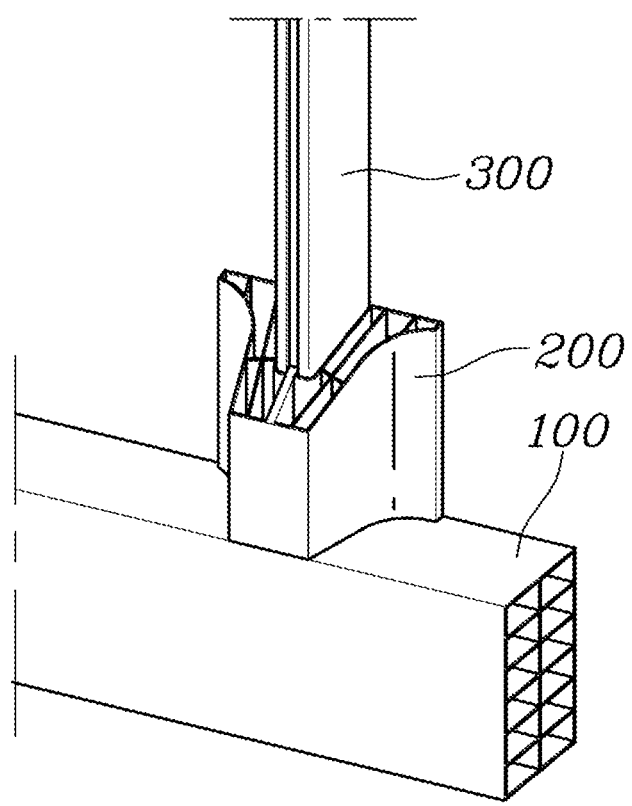
FIGS. 14A and 14B are views showing still another embodiment of the present invention.
Figure 14B:
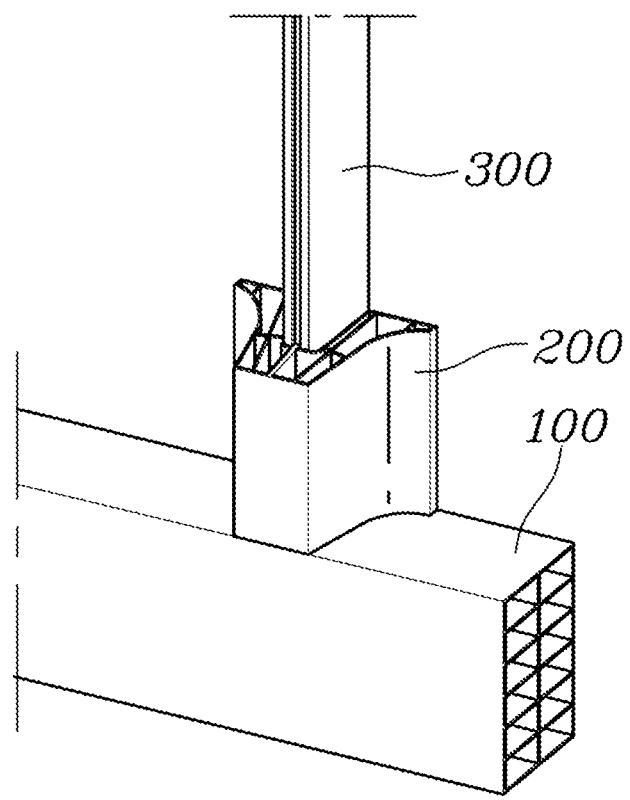

FIGS. 14A and 14B are views showing still another embodiment of the present invention.

As shown in FIGS. 14A and 14B, it may be confirmed that the inclination angle at the top of the coupling member may be varied according to the rigidity setting of the coupling member.

Figure 15:
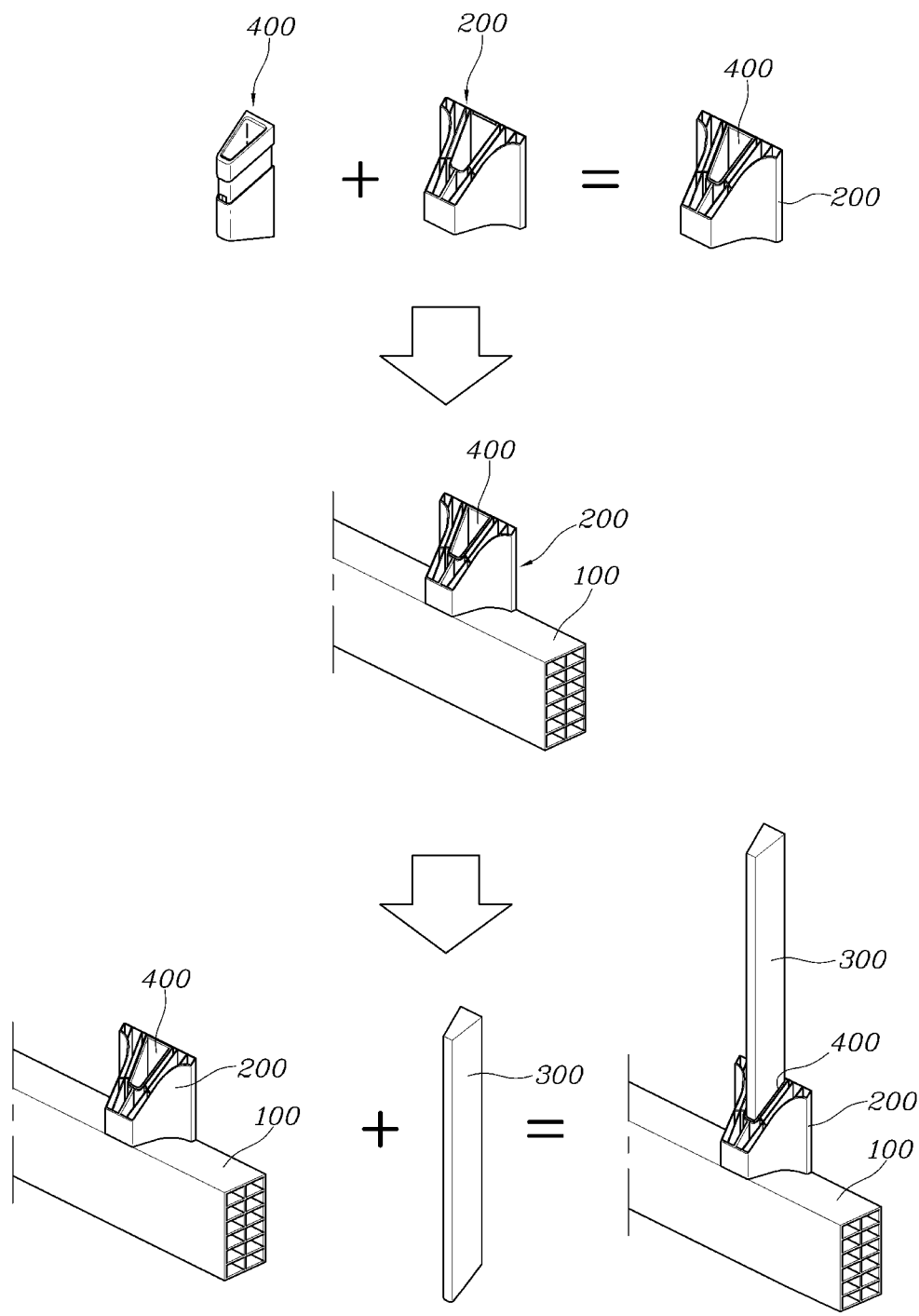
FIGS. 15 and 16 are views showing various manufacturing processes of a vehicle body according to an embodiment of the present invention.
Figure 16:
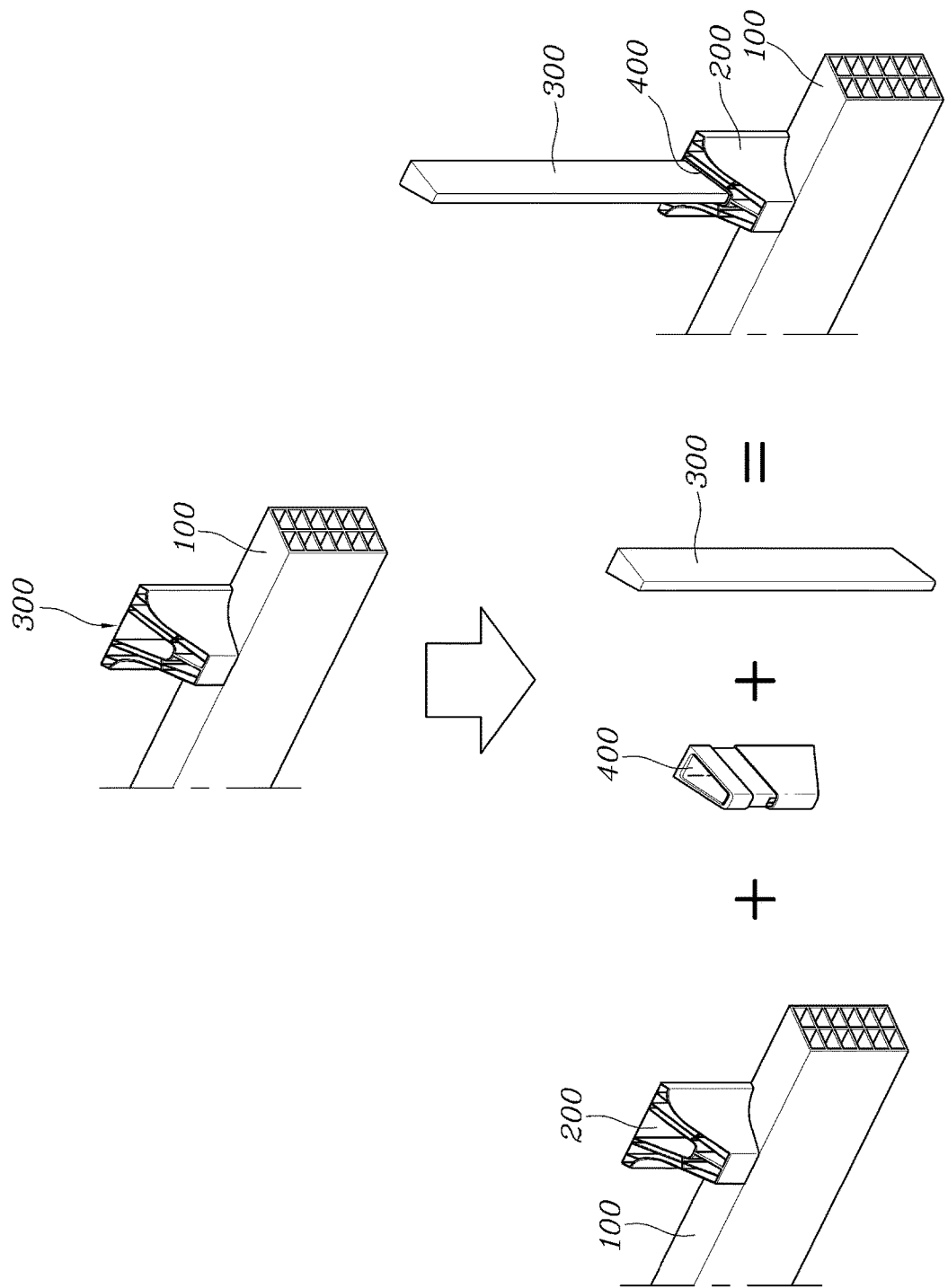

FIGS. 15 and 16 are views showing various manufacturing processes of a vehicle body according to an embodiment of the present invention.

FIGS. 15 and 16 show the manufacturing processes of embodiments of the present invention to which the connecting member 400 is applied. FIG. 15 shows a first manufacturing process and a second manufacturing process of embodiments of the present invention, and FIG. 16 shows a third manufacturing process of embodiments of the present invention.

The first manufacturing process of embodiments of the present invention may couple the connecting member 400 to the coupling member 200 by an adhesive material and then couple the coupling member to the side sill 100 by welding coupling. Thereafter, the pillar member 300 is inserted into the connecting member 400 and the pillar member 300, the connecting member 400, and the coupling member 200 may be coupled to each other by an adhesive material at a high temperature through a separate heating process. The first manufacturing process has the advantage of strong coupling strength.

The second manufacturing process is the same as the first manufacturing process up to welding of the coupling member 200 to the side sill 100, and insertion of the pillar member 300 into the connecting member 400, fixing by an adhesive material at the room temperature at the time of fixing, and a separate mechanical coupling such as bolting may be added. Compared with the first manufacturing process, the second manufacturing process has the advantage of simplifying the manufacturing process by eliminating the heating process.

The third manufacturing process may couple the pillar member 300 and the connecting member 400 to the coupling member 200 at the same time by coupling the coupling member 200 to the side sill 100 by welding coupling and injecting the adhesive material through the first injection hole 250 formed in the coupling member 200 to the connecting member 400 and the pillar member 300. Compared with the first and second manufacturing processes, the third manufacturing process has the advantage of simplifying the coupling process.

The specific embodiments of the present invention are illustrated and described, but it will be self-evident to those skilled in the art that the present invention may be improved upon and modified in various ways within the scope not departing from the technical spirit of the present invention provided by the patent claims below.

What is claimed is:

1. A vehicle body comprising:
a side sill coupled to a side of a vehicle floor and extending in a front-rear direction of the vehicle body;
a coupling member coupled to a top of the side sill and having a coupling groove penetrating in an up-down direction; and
a pillar member extending in the up-down direction such that an upper end portion is connected to a roof and a lower end portion is inserted into the coupling groove and coupled to the coupling member,
wherein the coupling member comprises a first injection hole that penetrates the coupling groove from outside and through which an adhesive material is injected.

2. The vehicle body of claim 1, wherein:
the coupling member comprises a protrusion portion protruding from an inner surface toward a center of the coupling groove; and
the pillar member comprises an insertion portion into which the protrusion portion is inserted, the insertion portion having a shape corresponding to the protrusion portion at the lower end portion.

3. The vehicle body of claim 2, wherein the protrusion portion has a cross-sectional area that expands in a protruding direction and is fitted into the insertion portion concurrently with insertion of the pillar member into the coupling groove downward from above.

4. The vehicle body of claim 1, wherein the coupling member comprises a rib formed inside and extending in a direction crossing the coupling groove that extends in the up-down direction and coupling the coupling groove to an outer surface of the coupling member.

5. The vehicle body of claim 1, wherein the coupling member comprises a second injection hole that penetrates in the up-down direction and through which the adhesive material is injected to a lower surface of the coupling member.

6. The vehicle body of claim 5, wherein the second injection hole comprises an opening portion in which a part of an outer surface is open.

7. The vehicle body of claim 1, wherein the coupling member and the pillar member are coupled to each other by bolting inward from outside in a direction crossing a length direction of the pillar member.

8. The vehicle body of claim 1, wherein an upper surface of the coupling member is inclined upward from an inside to an outside of the vehicle body.

9. The vehicle body of claim 1, wherein the coupling member comprises a cover covering an upper surface.

10. A vehicle body comprising:
a side sill coupled to a side of a vehicle floor and extending in a front-rear direction of the vehicle body;
a coupling member coupled to a top of the side sill and having a coupling groove penetrating in an up-down direction;
a pillar member extending in the up-down direction such that an upper end portion is connected to a roof and a lower end portion is inserted into the coupling groove and coupled to the coupling member; and
a connecting member extending in the up-down direction and inserted into the coupling groove, the connecting member connecting the pillar member to the coupling member by insertion of the lower end portion of the pillar member into a through groove that penetrates in the up-down direction.

11. The vehicle body of claim 10, wherein:
the coupling member comprises a first injection hole that penetrates the coupling groove from outside and through which an adhesive material is injected; and
the connecting member comprises a first guide groove inclined downward and indented from an outer surface of the coupling member at a position where the adhesive material is introduced from the first injection hole to guide a flow of the adhesive material.

12. The vehicle body of claim 11, wherein the connecting member comprises:
a first flow hole that penetrates the through groove at a lower end portion of the first guide groove such that the adhesive material flowing from the first flow hole is injected into the through groove; and
a second guide groove connected to the first flow hole and indented outward from an inner surface of the through groove to guide the flow of the adhesive material flowing in the first flow hole.

13. The vehicle body of claim 10, wherein:
the coupling member comprises a first injection hole that penetrates in the up-down direction and through which an adhesive material is injected to a lower surface of the coupling member; and
the connecting member comprises:
a second flow hole that penetrates the through groove at a position corresponding to the first injection hole; and
a third guide groove connected to the second flow hole and indented outward from an inner surface of a third insertion groove to guide a flow of the adhesive material flowing in the second flow hole.

14. A method of forming a vehicle body, the method comprising:
coupling a side sill to a side of a vehicle floor, the side sill extending in a front-rear direction of the vehicle body;
coupling a coupling member to a top of the side sill, the coupling member comprising a coupling groove penetrating in an up-down direction; and
providing a pillar member extending in the up-down direction such that an upper end portion is connected to a roof and a lower end portion is inserted into the coupling groove and coupled to the coupling member,
wherein the coupling member comprises a first injection hole that penetrates the coupling groove from outside, and wherein the method further comprises injecting an adhesive material through the first injection hole.

15. The method of claim 14, wherein:
the coupling member comprises a protrusion portion protruding from an inner surface toward a center of the coupling groove; and
the pillar member comprises an insertion portion into which the protrusion portion is inserted, the insertion portion having a shape corresponding to the protrusion portion at the lower end portion.

16. The method of claim 14, wherein the coupling member comprises a rib formed inside and extending in a direction crossing the coupling groove that extends in the up-down direction and coupling the coupling groove to an outer surface of the coupling member.

17. The method of claim 14, wherein the coupling member comprises a second injection hole that penetrates in the up-down direction, and wherein the method further comprises injecting the adhesive material through the second injection hole to a lower surface of the coupling member.

18. The method of claim 14, further comprising coupling the coupling member and the pillar member to each other by bolting inward from outside in a direction crossing a length direction of the pillar member.

\* \* \* \* \*